Patented Apr. 5, 1932

1,852,728

UNITED STATES PATENT OFFICE

WILLIAM B. WESCOTT, OF BOSTON, MASSACHUSETTS, ASSIGNOR TO RUBBER LATEX RESEARCH CORPORATION, OF BOSTON, MASSACHUSETTS, A CORPORATION OF MASSACHUSETTS

PLASTIC ADHESIONS

No Drawing.  Application filed April 6, 1928. Serial No. 268,072.

This invention relates to the art of plastic adhesives, particularly the art of securing bodies or masses of vulcanized material, notably rubber and rubber composition, to objects composed of material inherently different from rubber, such as metal, bakelite, wood, to all of which materials there is occasion to secure as firmly as possible a body of rubber in any of the various degrees of hardness produced by vulcanization, particularly in the sense that they are incapable in themselves of being vulcanized in the same manner as rubber, and so of being bonded to rubber by the direct method of vulcanization.

Rubber and ordinary rubber cements and compositions cannot be made to enter into cohesive union with surfaces of glass, wood, bakelite or clean metal. The best that can be effected is a mere adhesion. On the other hand proteids as a class will give good cohesive union with both rubber and metal, etc. Advantage is taken of this fact in the present invention, the metal, etc. being first provided with a dry cohering film coating of a composition containing proteid and rubber; and then a rubber layer vulcanized to the coated surface. Coagulable proteids becoming insoluble by heat are used. The proteid layer coheres to the rubber and to the metal, etc. and forms a linking layer giving a firm and permanent union.

My invention is characterized by the interposition between the object to which a rubber mass is to be attached (and which I will generally term the "base") and the rubber mass, of a film which comprises rubber, and preferably also a vulcanizing agent, which may include an accelerator, and a water-resistant proteid, the said film being deposited on the base as a mixture of rubber, the vulcanizing agent and the proteid in its soluble and coagulable condition uniformly mutually distributed in a water vehicle in which each component is distributable either by solution or dispersion. In the wet mixture so constituted the proteid, originally soluble, dispersible, or generally speaking susceptible to water, is, after deposit of the mixture in the base, rendered water-resistant so that when affixed to the base in a dry condition, the film material thus composed will not be liable to be softened or loosened by the action of moisture. In such a film the proteid constitutes the bonding material between the substance of the base and the rubber constituent of the film, so that any material attached to or incorporated with the film, as by vulcanization, is bound to the base to which, by surface contacts probably of molecular intimacy, the proteid material is attached. The proteid is likewise intimately bound to the rubber constituent of the film both after it has set to a dry solid state, and after vulcanization. Any vulcanizable material, therefore, which is vulcanized in intimate contact with the film, becomes integrated with the rubber constituent of the latter and is thereby firmly secured to the base. Rubber itself as stated does not unite intimately with most of the common materials, such as metals, glass, synthetic resins (bakelite) etc.; its utilization with rough or retecious objects by the process usually called "frictioning" involves the keying or interlocking, the intrusion and spreading of minute processes from the body of rubber material when the latter is in a plastic condition. Adhesion by such means is a mechanical mass phenomenon and can not take place to any sensible degree if the base or body to which the rubber is to be attached possesses a hard, smooth, dense surface, as is usually the case with metal, glass or even hard wood articles.

The intervenor or linking layer between a mass of rubber and a base to which the rubber is to be secured should be therefore, in the form of a film, the thinner the better, resident in which is a factor inherently capable of superficial, approximately or actually molecular, contact and adhesion with the substance of the base, and inherently capable also of similar association and adhesion to the vulcanizable factor in the film, a vulcanizable factor, to wit: rubber, and finally, if as is preferable it is incorporated in the film material, the vulcanizer. The rubber and the vulcanizer will function in the well known manner by uniting during vulcanization with the vulcanizable rubber or composition which is superposed upon the intervenor and contains vulcanizing agents of the same character as those which are constituents of the intervening film or which by means of its own content of vulcanizer contributes by contact and migration a vulcanizer for the rubber constituent of the film.

The rubber of the intervenor may be semicured or lightly vulcanized, as when peptized tube-reclaim is used; or may be lightly vulcanized while still in latex form. This is sometimes of advantage, particularly when use is made of proteids requiring other agents than heat to harden them.

I may use as the factor for securement to the base any of the proteids which are normally water soluble but capable of being hardened and rendered water-resistant and may thus be altered by appropriate methods and agents. For instance, if dextrin, animal glue or gluten be employed as the constituent proteid, (since these are not made water-resistant simply by elimination of water and application of heat) a reagent such as formaldehyde may well be used to treat these proteids to harden and render them water resistant in the construction of the film which is to form the intervening bond between a base and a vulcanized rubber material. Since the water solubility of these, and in fact of other proteids, is availed of, the rubber mixed with the proteid must be in water emulsion or suspension as in a natural latex or artificial latex such as may be prepared by peptizing an already coagulated rubber. With dextrin, animal glue, gluten and the like, which react with formaldehyde for hardening, first mix the proteid with a water suspension of rubber, in which also there is preferably distributed the vulcanizing agent, and spread this mixture while fluid upon the base. When the fluid has dried to a film, then treat it with formaldehyde; this renders the proteid component water-resistant without affecting the rubber component. Were formaldehyde to be introduced into the mixture while still fluid and before the latex has coagulated by drying, the uniform dispersion or distribution of the rubber component in the resulting film may be interfered with by premature coagulation of the rubber aggregates.

If such proteids as gelatin or isinglass are employed, make a bichromate solution of the proteid in the manner well known in the photographic art, then mix in a rubber and preferably also a vulcanizing agent, spread the mixture while fluid upon the base, and dry it. Then expose the film to light and the bichromated gelatin component will become water-resistant.

For reasons sounding in practicability and facility of process I prefer to employ a heat coagulable proteid such as egg albumin, blood or blood constituents, such as hemoglobin. Use of these preferred proteids permits simultaneous drying of the film and hardening of the proteid to render it water resistant by merely drying the film at a temperature sufficient to coagulate the proteid. The last named, so far as I have ascertained, constitutes the most effective proteid factor for the purposes of this invention.

For example, take rubber latex and mix it with a water solution of hemoglobin in such proportions that the mixture will contain 40 parts hemoglobin, and 50 parts latex solids. To these add 10 parts of a vulcanizing agent, which usually should include an accelerator. When these constituents have been thoroughly and mutually distributed in the mixture, apply the fluid mixture in a thin layer to the base, either by spraying or painting on or by dipping as circumstances may dictate. The consistency of the fluid mixture may be varied to suit different conditions. If, as may often be the case, the surface of the base is irregular or is not such as may constitute an even and horizontal support for the film material, the latter should contain only enough water to secure fluidity; the thickness or viscosity of the mixture will enable it to cling as a liquid film in much the same manner as ordinary paint. Viscosity can be regulated or graded by the introduction of small quantities of zinc oxid, which has the effect of thickening the hemoglobin solution.

After the film material has been applied it should be dried, preferably at a temperature which only just exceeds that at which the hemoglobin coagulates or sets. The atmosphere in which the films are dried should be regulated as to its moisture content; humidity between 20 per cent to 40 per cent saturation constitutes the practicable range, the optimum humidity being about 30 per cent. By drying the film in such an atmosphere at a temperature not far from 150° F., which is high enough to coagulate the hemoglobin and yet not high enough to bring about vulcanization of the film to any sensible degree, the moisture content of the proteid will be reduced to about 5 per cent on the weight of the proteid. A reduction of the moisture percentage below 8 per cent (its normal water of condition) is quite important, because if the content be above 8 per cent, there is more moisture present than is necessary for the coagulation reaction, and further the excess of moisture will form steam and make blisters when the film material is raised to vulcanizing temperature, which is usually well above 212° F. Hemoglobin containing only about 5 per cent of its weight in moisture may be considered as having an adjusted moisture content since it contains less than the normal content of moisture as water of condition which represents an equilibrium when the surrounding atmosphere contains the usual humidity of about 60 per cent of saturation and is at ordinary room temperature. When the film material has been dried under the above described conditions, the proteid is partially coagulated and is further thereafter protected against acquisition of moisture by the rubber which has also solidified, or irreversibly gelled in the drying process.

Coagulation of the hemoglobin at the above prescribed temperature of 150° F. requires several hours for completion. Usually it will be found preferable to coagulate partially by exposure from a few minutes to an hour at 150° F., which renders the hemoglobin sufficiently insensitive to moisture, completing coagulation at vulcanizing temperature during the succeeding stage of manufacture.

It will have been observed that the film material is applied in a wet and fluid state to the base; thus the proteid constituent is dispersed in solution in water. This solution enters into very intimate and thorough surface contact with the substance of the base effecting a cohesive union, be the surface never so smooth and close grained. When therefore the proteid constituent is hardened or coagulated, it assumes its water-resistant condition in situ, and in that condition persists in its intimate surface contact relation with the substance of the base. Likewise, the proteid when soluble and in solution intimately wets the rubber particles, and on hardening or coagulation preserves this intimacy, establishing thus a firm bond between the base and the rubber of the finally matured solid film; a bond which is effective upon a superposed mass, as of rubber, when the latter is integrated with or linked to, the film rubber, as by simultaneous vulcanization of the film rubber and the material of the applied mass.

The selection and the proportions of the vulcanizing agents should be determined by the rubber mass which is to be attached to the base by means of the intervening and bonding film. These vulcanizing agents should be preferably of the same character as those which are to be used in the rubber or rubber composition to be attached by means of the film. The proportions of the vulcanizing agents in the film should preferably be somewhat higher both as to vulcanizing agent proper and accelerator, so that the film material will at a given temperature and in a given time reach a little higher degree of vulcanization than the attached vulcanized material.

If celerity in vulcanization be not important, and if a relatively low vulcanization of the film rubber will suffice for the bond required, the film material may be compounded without a vulcanizer constituent; the vulcanizer incorporated in the mass to be applied and bonded to the base by means of the film will function to vulcanize the film rubber by transference or migration to the latter when the assembled materials are heated for vulcanization. In such case the applied vulcanizable mass may be provided with an excess of vulcanizer at the surface next to the film.

In all cases the rubber constituent of the film should be maintained at a high value, and therefore if for any reason fillers are to be incorporated in the film material, they should not be in such quantity as to reverse the phase as between filler and rubber. The practical test by which the operator can be guided in this respect will be in the obtainment of the ultimate bond desired with reference to the purposes and utilities to which the final assemblage of base, intervening and bonding film, and superposed rubber mass is destined. Moreover, if a filler is put in, it should be added after the rubber and the proteid have been mixed, for then the proteid will assist as a protective colloid to prevent flocculation. This precaution should be observed, moreover, if sulphur in solid comminuted form is to be the vulcanizing agent. And the same observations apply to the accelerator if such be incorporated in the film material.

When molding or wrapping is not feasible, as in lining tanks or vats, the film surface may be rendered tacky, preferably by being brushed over with a "solvent".

My invention may be utilized in many ways, for example, the tough, soft rubber of solid vehicle tires may thereby be secured to the steel rims or bands with a firm and permanent union stronger to resist tensile stresses than the rubber of the tire itself. Hard rubber molded parts may be secured to metal conductors, acid-proof sheets to the insides of vats, etc. by the employement of the within described bonding film. Such films, one applied to one base and another to another, may be employed each standing to the other in the relation of bonding film, or vice versa in the relation of superposed vulcanizable mass, as for instance if it be desired to secure two metal plates to each other or a metal plate to a glass plate. Each plate as a base having applied to it the bonding film as above described, the two are placed face to face under suitable pressure and subjected to heat of vulcanization. The vulcanizable constituents of both films will then become mutually integrated and the proteid components of either will serve as the factor which binds the vulcanized material intimately to the base.

The vulcanization of such bonding films may be varied to any desired degree from soft vulcanized rubber to hard ebonite. If it be desirable that the film lying next to the base be much higher cured than the superposed vulcanizable material, a second film with smaller percentages of both hemoglobin and vulcanizer than the first may be laid upon the first deposited film so as to intervene between it and the superincumbent mass of vulcanized material.

Film materials made as above described have been so adjusted as to proportions and treatment as to manifest a tensile strength of 9000 pounds to the square inch of cross section. These bonding films have demonstrated a utility in attaching rubber materials to bases of practically any solid substance, except those which are resistant to wetting by the applied proteid solution, such as, for instance oily or greasy materials, like leather. Therefore by the term "base" as used in the present specification and claims, I mean such solid substances as are wetted by the applied solutions of proteids of the types herein disclosed.

I claim:

1. In a laminated article, the combination of a base, a film comprising the hardened residues of an aqueous dispersion of a water soluble proteid and of rubber, the said base and film being cohesively united together, and a mass of vulcanized rubber superimposed on said film, the said film and said mass being mutually integrated and united together, the said uniting of the said film and said mass being effected by vulcanization, the said film serving as a bonding means to effectively unite the said mass to the said base.

2. In a laminated article, the combination of a base, a film comprising the heat hardened residues of an aqueous dispersion of a heat-coagulated water resistant proteid and of rubber, the said base and film being cohesively united together, and a mass of vulcanized rubber superimposed on said film, the said film and said mass being mutually integrated and united together, the said uniting of the said film and said mass being effected by vulcanization, the said film serving as a bonding means to effectively unite the said mass to the said base.

3. In a laminated article, the combination of a base, a film comprising the heat hardened residues of an aqueous dispersion of hemoglobin and of rubber, the said base and film being cohesively united together, and a mass of vulcanized rubber superimposed on said film, the said film and said mass being mutually integrated and united together, the said uniting of the said film and said mass being effected by vulcanization, the said film serving as a bonding means to effectively unite the said mass to the said base.

4. In a laminated article, the combination of a metallic base, a film comprising the hardened residues of an aqueous dispersion of a water soluble proteid and of rubber, the said base and film being cohesively united together, and a mass of vulcanized rubber superimposed on said film, the said film and said mass being mutually integrated and united together, the said uniting of the said film and said mass being effected by vulcanization, the said film serving as a bonding means to effectively unite the said mass to the said base.

5. In a laminated article, the combination of a metallic base, a film comprising the heat hardened residues of an aqueous dispersion of hemoglobin and of rubber, the said base and film being cohesively united together, and a mass of vulcanized rubber superimposed on said film, the said film and said mass being mutually integrated and united together, the said uniting of the said film and said mass being effected by vulcanization, the said film serving as a bonding means to effectively unite the said mass to the said base.

6. In a laminated article, the combination of a base, a film comprising the hardened and vulcanized residues of an aqueous dispersion of hemoglobin and of rubber, the said base and film being cohesively united together, and a mass of vulcanized rubber superimposed on said film, the said film and said mass being mutually integrated and united together, the said uniting of the said film and said mass being effected by vulcanization, the said film serving as a bonding means to effectively unite the said mass to the said base.

7. In a laminated article, a metallic base having a surface carrying an integrally united composite film comprising the hardened residues of an aqueous dispersion of a water soluble proteid and of rubber in intimate admixture, said film being adapted for application of rubber in vulcanized cohering union thereto.

8. In a laminated article, the combination of a steel base, a soft rubber film comprising the hardened and vulcanized residues of an aqueous dispersion of hemoglobin and of rubber, the said base and film being cohesively united together, and a mass of vulcanized rubber superimposed on said film, the said film and said mass being mutually integrated and united together, the said uniting of the said film and said mass being effected by vulcanization, the said film serving as a bonding means to effectively unite the said mass to said base.

9. In the production of laminated articles having a base united to a mass of vulcanized rubber by means of a film comprising a water resistant proteid and rubber, the process which comprises applying to said base a film of an aqueous liquid mixture containing rubber and a soluble proteid, treating the so applied film to harden the proteid in intimate surface contact with the substance of the base on one hand and the rubber of the film on the other and to render the proteid water resistant, and then superimposing upon the so treated film a mass of vulcanizable rubber and vulcanizing the so assembled article, whereby the vulcanizable mass is simultaneously vulcanized and mutually integrated and united with the so treated film.

10. In the production of laminated articles having a base united to a mass of vulcanized rubber by means of a film comprising a heat-coagulated water resistant proteid and rubber, the process which comprises applying to said base a film of an aqueous liquid mixture containing rubber and a soluble heat-coagulable proteid, treating the so applied film to coagulate the proteid in intimate surface contact with the substance of the base on one hand and the rubber of the film on the other and to render the proteid water resistant, and then superimposing upon the so treated film a mass of vulcanizable rubber and vulcanizing the so assembled article, whereby the vulcanizable mass is simultaneously vulcanized and mutually integrated and united with the so treated film.

11. In the production of laminated articles having a base united to a mass of vulcanizable rubber by means of a film comprising heat-coagulated hemoglobin and rubber, the process which comprises applying to said base a film of an aqueous liquid mixture containing rubber and hemoglobin, treating the so applied film to coagulate the hemoglobin in intimate surface contact with the substance of the base on one hand and the rubber of the film on the other and to render the hemoglobin water resistant, and then superimposing upon the so treated film a mass of vulcanizable rubber and vulcanizing the so assembled article, whereby the vulcanizable mass is simultaneously vulcanized and mutually integrated and united with the so treated film.

12. In the production of laminated articles having a base united to a mass of vulcanized rubber by means of a film comprising a water resistant proteid and vulcanized rubber, the process which comprises applying to said base a film of an aqueous liquid mixture containing rubber, a soluble proteid and a vulcanizing agent, treating the so applied film to harden the proteid in intimate surface contact with the substance of the base on one hand and the rubber of the film on the other and to render the proteid water resistant, and then superimposing upon the so treated film a mass of vulcanizable rubber and vulcanizing the so assembled article, whereby the vulcanizable mass and the so treated film are simultaneously vulcanized and mutually integrated and united with each other.

13. In the production of laminated articles having a base united to a mass of vulcanized rubber by means of a film comprising a heat-coagulated water resistant proteid and vulcanized rubber, the process which comprises applying to said base a film of an aqueous liquid mixture containing rubber, a soluble heat coagulable proteid, and a vulcanizing agent, treating the so applied film to coagulate the proteid in intimate surface contact with the substance of the base on one hand and the rubber of the film on the other and to render the proteid water resistant, and then superimposing upon the so treated film a mass of vulcanizable rubber and vulcanizing the so assembled article, whereby the vulcanizable mass and the so treated film are simultaneously vulcanized and mutually integrated and united together.

14. In the production of laminated articles having a base united to a mass of vulcanized rubber by means of a film comprising heat-coagulated hemoglobin and vulcanized rubber, the process which comprises applying to said base a film of an aqueous liquid mixture containing rubber, hemoglobin and a vulcanizing agent, treating the so applied film to coagulate the hemoglobin in intimate surface contact with the substance of the base on one hand and the rubber of the film on the other and to render the hemoglobin water resistant, and then superimposing on the so treated film a mass of vulcanizable rubber and vulcanizing the so assembled article, whereby the vulcanizable mass and the so treated film are simultaneously vulcanized and mutually integrated and united together.

15. The process of claim 9 in which the base is a metallic base.

16. The process of claim 11 in which the base is a steel base.

17. In the production of laminated articles having a base united to a mass of vulcanized rubber by means of a film comprising a water resistant proteid and rubber, the process which comprises applying to said base a film of an aqueous liquid mixture containing rubber and a soluble proteid, drying the film, treating the so dried film to harden the proteid in intimate surface contact with the substance of the base on one hand and the rubber of the film on the other and to render the proteid water resistant, and then superimposing upon the so treated film a mass of vulcanizable rubber and vulcanizing the so assembled article, whereby the vulcanizable mass is simultaneously vulcanized and mutually integrated and united with the so treated film.

18. In the production of laminated articles having a base united to a mass of vulcanized rubber by means of a film comprising a water resistant proteid and vulcanized rubber, the step of preparing a coated base which comprises depositing on said base a film of an aqueous liquid mixture containing rubber, a soluble proteid and a vulcanizing agent, treating the so deposited film to harden the proteid in intimate surface contact with the substance of the base on one hand and the rubber of the film on the other and to render the proteid water resistant thereby producing a coated base capable of being united and bonded to a mass of rubber by vulcanization and having a film coating which is capable of being simultaneously vulcanized with the said mass of rubber.

19. In the production of laminated articles having a base united to a mass of vulcanized rubber by means of a film comprising a heat-coagulated water resistant proteid and vulcanized rubber, the step of producing a coated base which comprises depositing on said base a film of an aqueous liquid mixture containing rubber, a soluble heat-coagulable proteid and a vulcanizing agent, treating the so deposited film to coagulate the proteid in intimate surface contact with the substance of the base on one hand and the rubber of the film on the other and to render the proteid water resistant, thereby producing a coated base capable of being united and bonded to a mass of rubber by vulcanization and having a film coating which is capable of being simultaneously vulcanized with the said mass of rubber.

20. In the production of laminated articles having a base united to a mass of vulcanized rubber by means of a film comprising a heat-coagulated hemoglobin and vulcanized rubber, the step of producing a coated base which comprises applying to said base a film of an aqueous liquid mixture containing rubber, hemoglobin and a vulcanizing agent, drying the film at a temperature sufficient to coagulate the hemoglobin and for a time sufficient to give the dried film a sub-normal moisture content thereby producing a coated base capable of being united and bonded to a mass of rubber by vulcanization and having a film coating which is capable of being simultaneously vulcanized with the said mass of rubber.

21. The process of claim 18 in which the base is a metallic base.

22. The process of claim 20 in which the base is a steel base.

In testimony whereof, I have hereunto affixed my signature.

WILLIAM B. WESCOTT.